United States Patent [19]

Motonami et al.

[11] 4,319,667
[45] Mar. 16, 1982

[54] LOCKING DEVICE FOR SEATBELT SYSTEMS

[75] Inventors: Masanao Motonami; Jun Yasumatsu, both of Toyota; Yoshio Tsujiuchi, Nagoya, all of Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 169,177

[22] Filed: Jul. 15, 1980

Related U.S. Application Data

[63] Continuation-in-part of Ser. No. 874, Jan. 4, 1979, Pat. No. 4,234,185.

[30] Foreign Application Priority Data

Mar. 28, 1978 [JP] Japan ............................ 53-40618

[51] Int. Cl.³ ............................................ A62B 35/02
[52] U.S. Cl. .............................. 188/65.1; 242/107.2
[58] Field of Search ....... 242/107.2, 107.4 R–107.4 E; 280/501–808; 297/474–480; 188/65.1–65.4, 65.5

[56] References Cited

U.S. PATENT DOCUMENTS

| 3,504,867 | 4/1970 | Stevenson | 242/107.2 |
| 4,120,466 | 10/1978 | Adomeit | 242/107.2 |
| 4,163,530 | 8/1979 | Kondo et al. | 242/107.2 X |
| 4,211,377 | 7/1980 | Vasumatsu | 242/107.2 |
| 4,241,886 | 12/1980 | Maekawa | 242/107.2 |

Primary Examiner—John M. Jillions
Attorney, Agent, or Firm—Stevens, Davis, Miller & Mosher

[57] ABSTRACT

A locking device for seatbelt systems including a rotatable locking base with a wavy surface, a locking member provided adjacent the rotatable locking base and which is movable such that it engages with the locking base, a seatbelt portion which extends between the rotatable locking base and the locking member having an arm member with a wavy surface which senses the tension on such seatbelt portion and which engages with the locking member such that the locking member is caused to move when the arm member senses a tension on said seatbelt portion which is greater than a predetermined tension and such that the locking member presses the seatbelt portion against the rotatable base across its entire width when the locking member is caused to move by the arm member.

6 Claims, 20 Drawing Figures

LOCKING DEVICE FOR SEATBELT SYSTEMS

CROSS REFERENCE TO RELATED APPLICATION

This is a continuation-in-part of a previous application Ser. No. 00,874, filed on Jan. 4, 1979 now U.S. Pat. No. 4,234,185.

BACKGROUND OF THE INVENTION

1. Field of the Invention

This invention relates to seatbelt systems which restrain and protect passengers during vehicle emergencies and more particularly, to locking devices for such seatbelt systems.

2. Prior Art

Generally, seatbelt systems are designed such that one end of the passenger-restraining belt is retracted with a specific amount of force on a retractor fastened to the vehicle so that tension is always placed on an intermediate portion of the seatbelt. This tension caused the intermediate portion of the seatbelt to press against the body of the passenger so that the passenger is in a seatbelt-fastened condition. Furthermore, when the passenger removes the seatbelt, the seatbelt is automatically retracted and stored.

Recently, however, the low precentage of passenger use has led to the use of the so-called passive seatbelt systems which force the passenger to wear the seatbelt after entering the vehicle. Such passive seatbelt systems are arranged such that when the passenger enters the vehicle, the seatbelt is caused to move toward the front of the vehicle so that a sufficient space for the passenger to enter or leave the vehicle is formed between the seatbelt and the passenger seat. When the passenger slides his body into the space so that he is seated, the seatbelt is caused to move back toward the passenger seat. Accordingly, the space in front of the passenger contracts so that an intermediate portion of the seatbelt is fastened around the passenger thereby automatically placing the passenger in a seatbelt fastened condition. If the vehicle is involved in an emergency situation such as a collision and the seatbelt has been fastened around the passenger, a pawl actuated by an inertia sensor is caused to engage with the ratchet wheels fastened to the seatbelt retractor shaft inside the retractor so that the rotation of the retractor shaft in the direction of seatbelt extension is abruptly stopped. Accordingly, extension of the webbing is prevented and the passenger is restrained.

In such passive seatbelt systems, however, the seatbelt is caused to move a great distance when the passenger enters or leaves the vehicle. As a result, the amount of seatbelt retracted on the retractor is extremely large in comparison to the amount retracted in an ordinary seatbelt system. For this reason, the webbing retracted on the retractor shaft continues to be extended even after the rotation of the retractor shaft in the direction of the seatbelt extension has been stopped during a vehicle emergency. The extension continues until the seatbelt is tightly wound on the retractor shaft. In other words, the seatbelt is tightened on the retractor shaft so that a length of seatbelt corresponding to the amount by which the seatbelt is tightened is continued to be extended from the retractor. As a result, such passive seatbelt systems suffer from a drawback of incomplete passenger restraint.

SUMMARY OF THE INVENTION

Accordingly, it is a general object of the present invention to provide a seatbelt locking device for seatbelt systems which makes it possible to securely lock an intermediate portion of the passenger restraining seatbelt so that the passenger is immediately and securely restrained during an emergency situation.

The abovementioned object is accomplished by a unique locking device for seatbelt systems. The locking device includes a fixed locking base, a locking member provided adjacent the fixed locking base and which is movable such that it engages with the locking base, a seatbelt portion which extends between the fixed locking base and the locking member and an arm member which senses the tension on the seatbelt portion and which engages with the locking member such that the locking member is caused to move when the arm member senses a tension on such seatbelt portion which is greater than a predetermined tension and such that the locking member presses the seatbelt portion against the fixed base with a suitable tension gradient when the locking member moves.

BRIEF DESCRIPTION OF THE DRAWINGS

The abovementioned features and objects of the present invention will become more apparent with reference to the following description taken in conjunction with the accompanying drawings, wherein like reference numerals denote like elements, and in which.

DETAILED DESCRIPTION OF THE INVENTION

Figure 1:
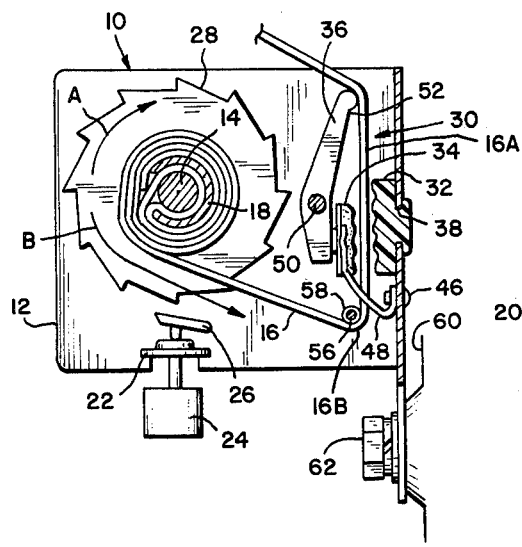
FIG. 1 is a cross-sectional view illustrating a first embodiment of the seatbelt locking device in accordance with the teachings of the present invention.
Figure 2:
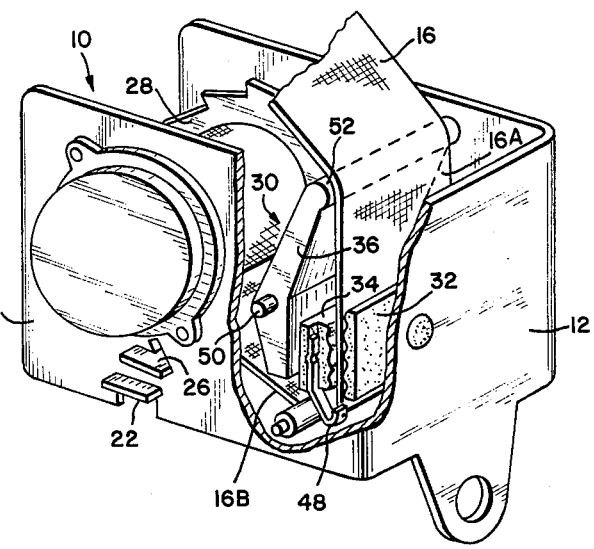
FIG. 2 is an oblique view of the embodiment of FIG. 1.
Figure 3:
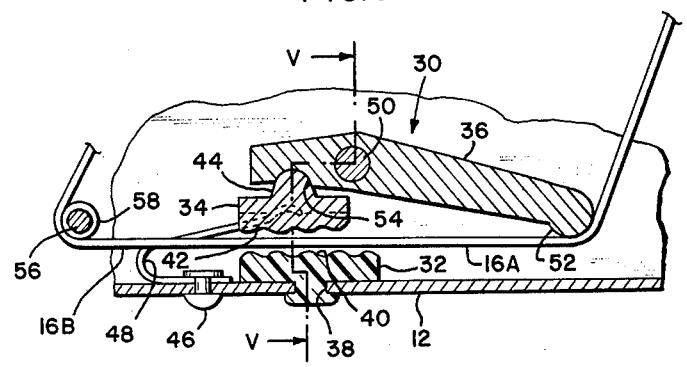
FIG. 3 is a magnified view of the essential parts of the embodiment of FIG. 1.
Figure 4:
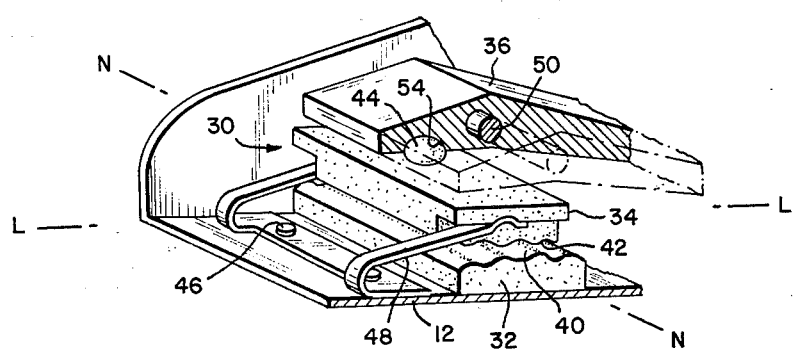
FIG. 4 is an oblique view of FIG. 3.

In reference to the drawings, shown in FIGS. 1 through 5 is a first embodiment of the seatbelt locking device in accordance with the teaching of the present invention. In this embodiment, the seatbelt locking device is provided with a retractor 10. The retractor 10 includes a retractor shaft 14 supported on a frame 12 which is made by bending a metal plate into roughly a U-shape. One end of the passenger restraining seatbelt is wound around the retractor shaft 14. Furthermore, this end of the seatbelt 16 is secured to the retractor shaft 14 by being passed through and around a C-shaped stopper 18. In addition, a spring driven retractor mechanism 20 is installed between the retractor shaft 14 and the frame 12 on the portion of the retractor shaft 14 which projects from the frame 12. This mechanism 20 powers the retractor shaft 14 in the direction indicated by the arrow A such that the seatbelt 16 is retracted. Accordingly, the passenger can position the seatbelt 16 around himself by pulling the seatbelt 16 in the direction indicated by the arrow B against the force of the spring-driven retractor mechanism 20.

Furthermore, a bracket 22 is installed across the bottom of the frame 12 and a pendulum 24 is suspended from the bracket 22. A pawl 26, supported so that it is free to swing toward the bracket 22, is installed above the pendulum 24. During a vehicular emergency, the pawl 26 is pushed upward by the pendulum 24 which swings when it detects deacceleration of the vehicle. As a result, the pawl 26 engages with a ratchet wheel 28 attached to the retractor shaft 14 so that the rotation of the retractor wheel 28 and the retractor shaft 14 in the direction of the seatbelt extension is stopped.

The locking device 30 provided by this invention is attached to the frame 12. The locking device 30 includes a fixed base 32, a locking member 34 and an arm 36.

The fixed base 32 is made from plastic, but the fixed base 32 could also be made from metal. One end of the fixed base 32 is fastened to the frame 12 by pressing the tip of the end through a fastening hole 38 drilled in the frame 12 so that the tip is locked in the fastening hole 38. A wavy surface 40 is formed on the other side of the fixed base 32 and this surface 40 forms a locking surface for the seatbelt 16.

Furthermore, a wavy surface 42 is formed on one surface of the locking member 34 facing the wavy surface 40 of the fixed base 32. A hemispherical projection 44 projects from the opposite surface of the locking member 34. The locking member 34 is engaged on both sides by the ends of a leaf spring 48 whose other end is fastened to the frame 12 by rivets 46. As a result, the locking member 34 is driven in a direction which separates it from the fixed base 32, i.e., in a direction which causes both of the wavy surfaces 40 and 42 to be separated from each other.

A pin 50 is passed through an intermediate part of the arm 36. The pin 50 is supported on the frame 12 and the arm 36 is provided on the pin 50 such that it can pivot relative to the frame 12. The tip of one end of the arm 36 has a rounded contact surface 52 and this contact surface 52 contacts an intermediate portion of the seatbelt 16. A hemispherical recess 54 is formed at the other end of the arm 36. This recess 54 engages with the hemispherical projection 44 on the locking member 34. The hemispherical projection 44 and the hemispherical recess 54 cause torque on the arm 36 to be transmitted to the locking part 34 such that the locking part 34 is caused to approach the fixed base 32. The coupling device formed by the hemispherical projection 44 and the hemispherical recess 54 allow the locking part 34 to rotate about the major axis (line L—L) and the minor axis (line N—N) of the seatbelt 16.

Thus, the locking device 30 is fastened to a portion of the frame 12. The seatbelt 16 extending from the retractor shaft 14 passes between the locking member 34 and the fixed base 32 after being turned around a roller 58 which is supported on the frame 12 by means of a pin 56. The seatbelt 16 is then turned around the contact surface 52 on the arm 36 and extends in a direction of the passenger seat. The seatbelt retractor 10 is further fastened to the motor vehicle 60 by means of the fastening bolt 62.

In operation, the retracting force is constantly applied to the retracting shaft 14 by the spring-driven retractor mechanism 20. Accordingly, there is a constant retracting tension acting on the seatbelt 16 extending from the retractor shaft 14. In order to position the seatbelt 16 around himself, the passenger pulls the seatbelt 16 against the retracting force of the spring-driven retractor mechanism 20. When the seatbelt 16 is thus pulled, it moves in the direction indicated by the arrow B such that the seatbelt 16 can be positioned around the passenger. In this case, the retracting force on the spring-driven retractor mechanism 20 gradually increases as the seatbelt 16 is extended. As a result, the arm 36 attempts to rotate in a counterclockwise direction about the pin 50. However, the leaf spring 48 causes the locking member 34 to oppose the rotational force. Accordingly, the locking member 34 is maintained at an appropriate distance from the fixed base 32.

When the vehicle is involved in an emergency situation such as a collision, the passenger is violently thrown in the direction of the vehicle impact. As a result, the seatbelt 16 is extended from the retractor 10 and the seatbelt 16 begins to move rapidly in the direction indicated by the arrow B. However, the pendulum 24 detects the deacceleration of the vehicle and swings to push the pawl 26 upwardly such that the pawl 26 engages with the ratchet wheel 28 to thereby stop rotation of the retractor shaft 14 in the direction of the seatbelt 16 extension. This causes an abrupt increase in the tension on the seatbelt 16. As a result, torque is caused to be applied to the arm 36 which is in contact with the seatbelt 16 via the contact surface 52. Accordingly, the arm 36 rotates in a counterclockwise direction about the pin 50 with a great force. Accordingly, torque of the arm 36 causes the locking member 34 to move against the force of the leaf spring 48 such that the seatbelt 16 is securely clamped between the wavy surfaces 40 and 42.

Figure 5:
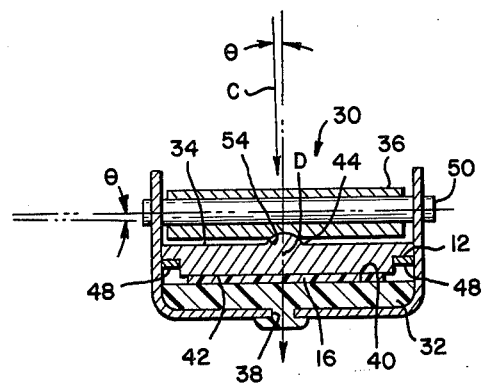
FIG. 5 is a cross-sectional view along the lien V—V in FIG. 3.

Referring to FIG. 5, the following is the description of the situation wherein errors have been committed in the installation of the various parts making up the locking device 30. For example, in the case where the pin 50 of the arm 36 is installed in the frame 12 such that the axis of the pin 50 has an installation error of angle $\theta$, the torque of the arm 36 acting on the locking member 34 is inclined as indicated by the arrow C. If the locking member 34 similarly moves in the direction indicated by the arrow C and clamps the webbing between itself and the fixed base 34, the clamping force will act only on a portion of the width of the seatbelt 16. As a result, there is a danger that the seatbelt 16 will be cut by the clamping force.

In this embodiment, however, the torque of the arm 36 is transmitted to the locking member 34 via the hemispherical recess 54 and the hemispherical projection 44. As a result, the locking member 34 is able to rotate about both the major and minor axes of the web of the seatbelt 16. Accordingly, installation error of the arm 36 relative to the frame 12 is corrected. Therefore, the locking member 34 clamps the seatbelt 16 perpendicular to the surface of the seatbelt 16 as indicated by the arrow D, i.e. the seatbelt 16 is clamped by a uniform clamping force applied across the entire width of the seatbelt 16. As a result, movement of the seatbelt 16 in the direction of the extension is securely prevented.

Figure 6:
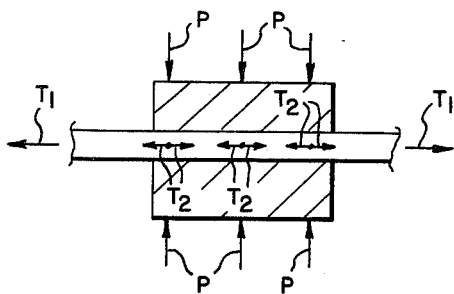
FIG. 6 is an explanatory view showing the conditions of the external and internal tensions generated in the seatbelt clamped under the ordinary conditions.

As described above, when a seatbelt 16 is clamped between a pair of waveshaped surfaces under a clamping force P as shown in FIG. 6, in general, the tensions generated in the seatbelt 16 thus clamped are divided into two types of tensions including an external tensions $T_1$ and an internal tensions $T_2$. The external tensions $T_1$ are stresses in which inertial forces of an occupant generated by acceleration of a colision of the vehicle pull the seatbelt in the longitudinal directions. While, the internal tensions $T_2$ are tensions generated in the seatbelt clamped under the clamping force P, said tensions acting as forces tending to extend in the longitudinal directions. These internal tensions are generated in pairs in a manner to eliminate each other.

Figure 7:
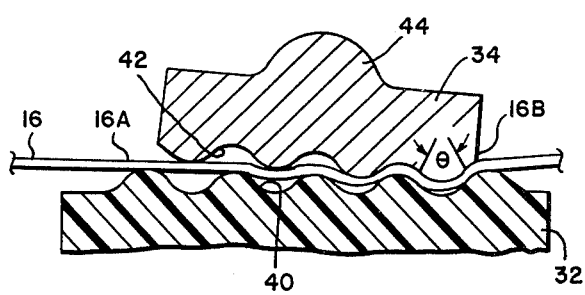
FIG. 7 is a magnified longitudinal cross-section of FIG. 5.

Now, in this embodiment, since the locking member 34 is rotatable relative to the arm 36, if the occupant is violently thrown out into the direction of a collision of the vehicle, high external tensions act on the seatbelt 16 and an occupant's side 16A of the seatbelt 16 being clamped is extended as shown in FIG. 7, thereby slightly rotating the locking member in the clockwise direction.

Figure 8A:
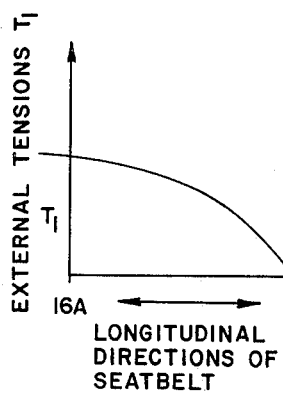
FIGS. 8A, 8B and 8C are diagrams respectively showing changes in the external tensions in a first embodiment of the present invention, changes in the internal tensions and changes in the composite stress.

If the friction coefficient between the seatbelt 16 thus clamped and the pair of waveshaped surfaces 40, 42 clamping the seatbelt is $\mu$ and the contact angle between the seatbelt and the waveshaped surfaces is $\theta$ (Refer to FIG. 7), then the damping factor of the external tensions $T_1$ can be given by $(1/\mu\theta)$. Consequently, the occupant's side 16A of the seatbelt 16 is higher in tension than the retractor's side 16B (Refer to FIG. 8A).

Figure 8B:
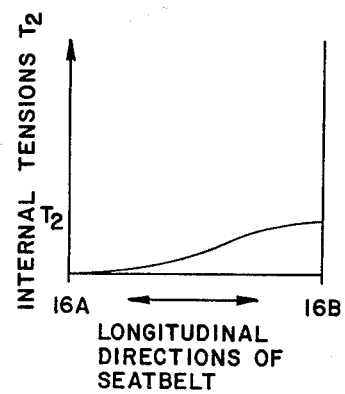

On the other hand, as for the internal tensions $T_2$ in the clamped portion, since the seatbelt 16 is progressively strongly clamped toward the retractor's side 16B, the internal tensions $T_2$ are progressively increased toward the retractor's side 16B (Refer to FIG. 8B).

Figure 8C:
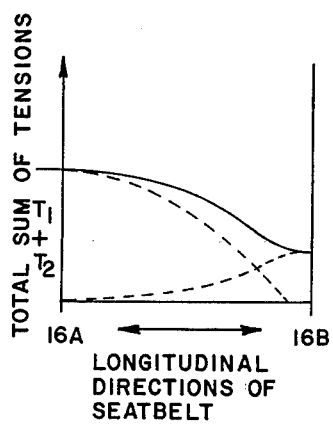

With the arrangement as described above, the total sum of tensions $(T_1+T_2)$ acting on the seatbelt 16 becomes moderate as shown in FIG. 8C, whereby no abrupt change is observed in the clamped portion, thus enabling to prevent the seatbelt from being broken in two.

As a result of the seatbelt 16 being blocked by the locking device 30, further tension on the seatbelt 16 is not transmitted to the retractor shaft 14. Therefore, there is no danger that the seatbelt 16 will be extended from the retractor 10 due to the tightening of the seatbelt 16 on the retractor shaft 14 as in conventional devices. Therefore, a passenger wearing the seatbelt 16 is securely restrained.

Figure 9A:
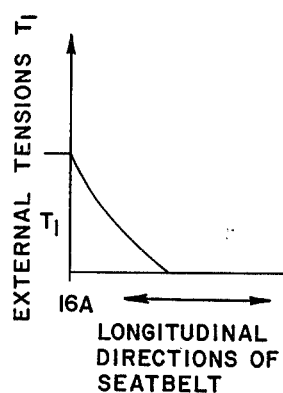
FIGS. 9A, 9B and 9C are diagrams respectively showing changes in the external stresses when the locking member is unrotatable, changes in the internal stresses and changes in the composite stress.
Figure 9B:
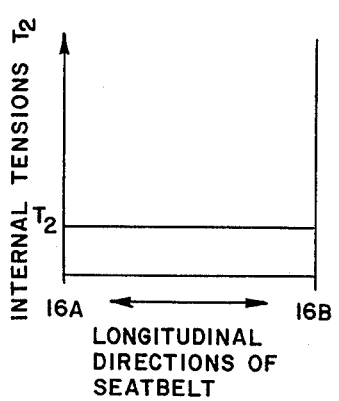

Next, the case where the locking member 34 is unrotatably fixed on the arm is explained in comparison with the seatbelt tensions in this embodiment. Since the locking member 34 is closely attached to the fixed base 32 through the seatbelt 16, the highest external tensions $T_1$ are generated at the occupant's side 16A of the seatbelt 16 (Refer to FIG. 9A), and the internal tensions $T_2$ are substantially uniform throughout the locking member 34 (Refer to FIG. 9B).

Figure 9C:
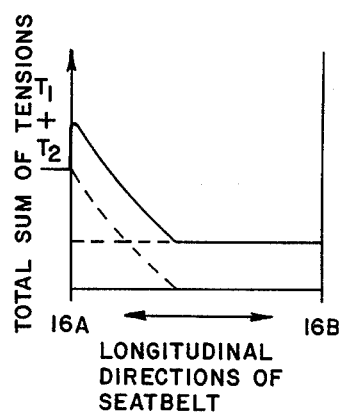

Consequently, the composite tension reaches to its peak at the occupant's side 16A of the seatbelt 16 (Refer to FIG. 9C), where the seatbelt may be broken in two.

Figure 10:
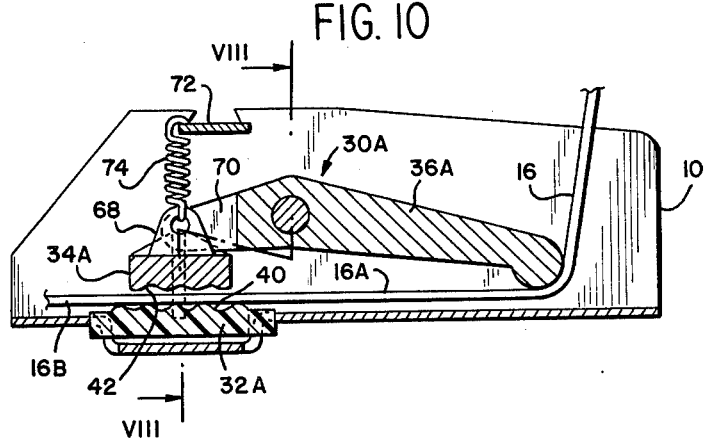
FIG. 10 is a magnified cross-sectional view which illustrates the essential parts of the second embodiment of the seatbelt locking device in accordance with the teaching of the present invention.
Figure 11:
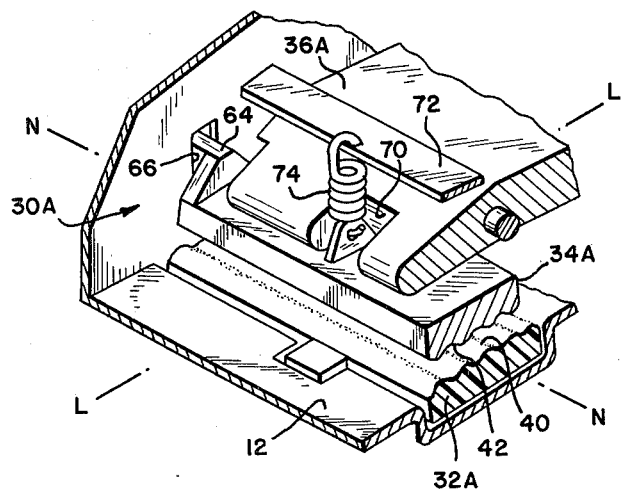
FIG. 11 is an oblique view of FIG. 6.
Figure 12:
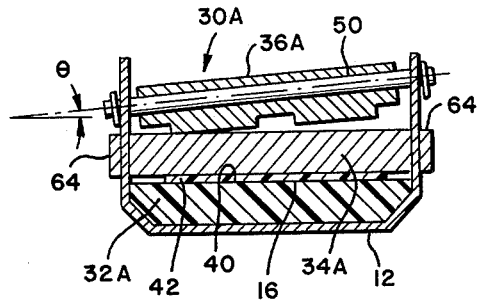
FIG. 12 is a cross-sectional view along the line VIII—VIII in FIG. 6.

Referring to FIGS. 10 through 12, shown therein is a second embodiment of a locking device in accordance with the teachings of the present invention. In this second embodiment, another type of coupling device for transmitting torque from the arm 36A to the locking part 34A is illustrated and described.

In this second embodiment, extensions 64 are formed on both sides of the locking member 34A. These extensions 64 are respectively inserted into guide windows 66 drilled in the frame 12A such that the locking member 34A can approach and move away from the fixed base 32A. In this case, a considerable amount of space is provided between the extensions 64 and the guide windows 66. Thus, if necessary, the locking member 34A can move in the directions of the major axis and the minor axis of the seatbelt 16. Furthermore, a bracket 68 is attached to the top of the locking member 34A. This bracket 68 passes through cutout slot 70 formed in one end of the arm 36A. A tension coil spring 74 is installed between the bracket 68 and a support 72 provided on the frame 12A such that the locking member 34A is driven in the direction which separates from the fixed base 32A. In this second embodiment, the force of the tension coil spring 74 causes a space to be maintained between the locking member 34A and the fixed base 32A under normal vehicle operational conditions so that the seatbelt 16 can be extended from the retractor.

During an emergency situation, the arm 36A detects the tension on the seatbelt 16 and causes the locking member 34A to approach the fixed base 32A. Accordingly, an intermediate portion of the seatbelt 16 is securely locked and the passenger is securely restrained such that the safety of the passenger is insured. Furthermore, the locking member 34A is supported on the frame 12A such that it can move in the direction of the major and minor axes of the seatbelt 16. As a result, in cases where the locking device 30A has an installation error relative to the frame 12A (as shown in FIG. 12), the locking member 34A can rotate appropriately about the major and minor axes of the seatbelt 16. Furthermore, the locking member 34A is rotatable about the axis perpendicular to the longitudinal direction of the seatbelt, whereby a tension gradient, is formed in the seatbelt 16 as clamped similarly to the preceding embodiment, thereby preventing the seatbelt from being broken.

Figure 13:
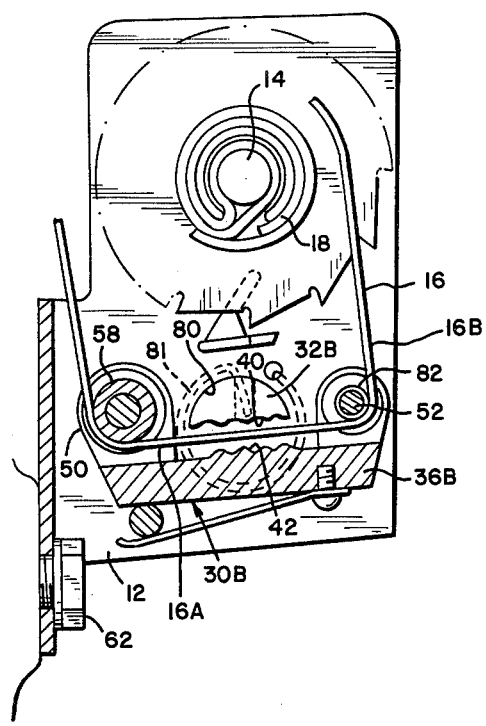
FIG. 13 is a third embodiment of a seatbelt locking device.
Figure 14:
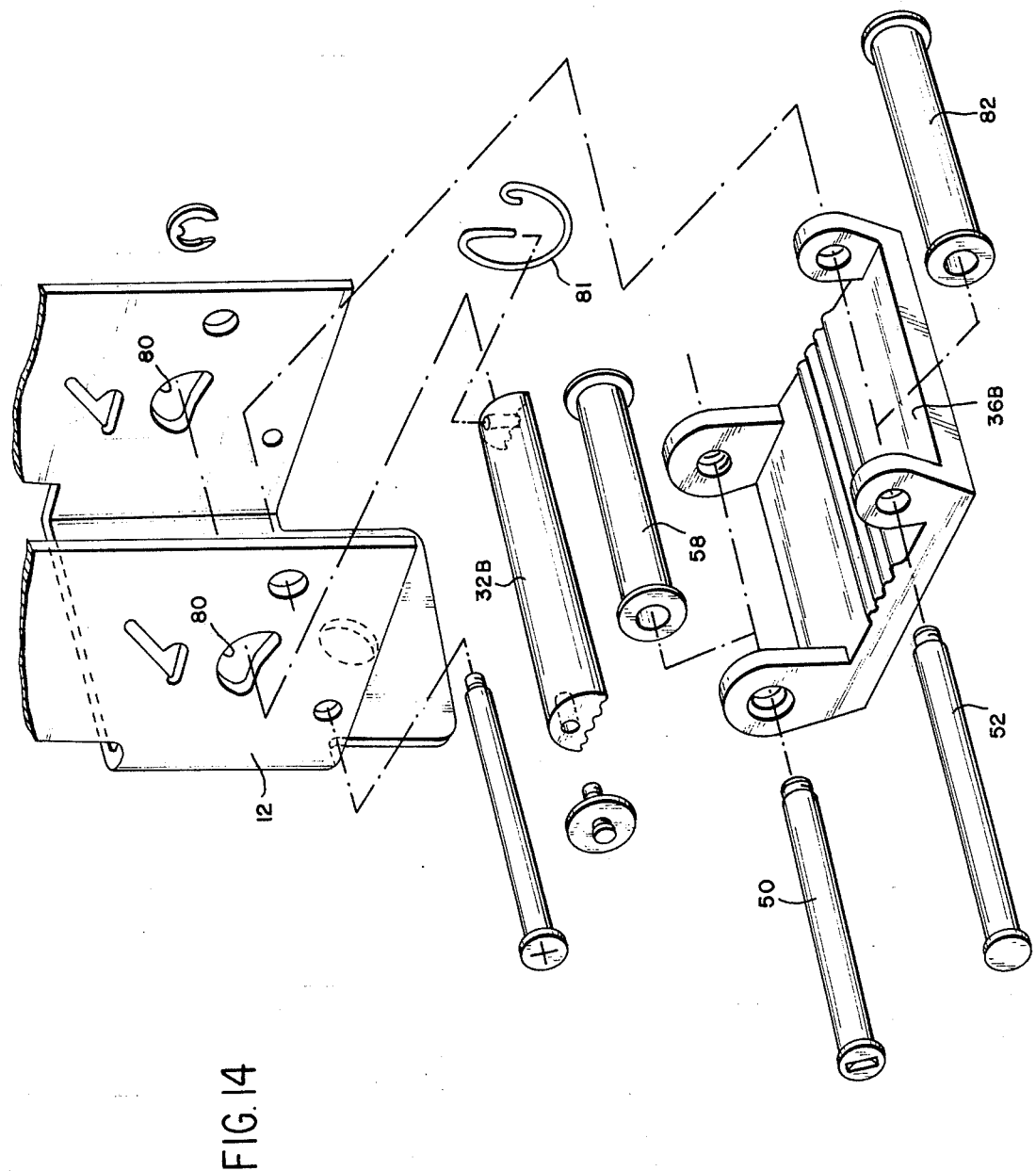
FIG. 14 is an exploded view of FIG. 9.

Next in FIGS. 13 and 14, therein is shown a third embodiment of the present invention. In this embodiment, the locking member is integrally formed on the arm 36B so that the wavy surface 42 cannot be moved relative to the arm 36B. As against this, the base 32B is rotatable about the axis perpendicular to the longitudinal direction of the seatbelt.

More specifically, the base 32B is a longitudinal member having a semicircular cross-section, inserted into a sector-shaped pivotal support hole 80 formed in the frame 12, and the central angle of said sector-shape is made to be about 200°, thus enabling the base 32B to rotate within the sector-shape. A substantially letter "C" shaped tension spring 81 is interposed between one end of the base 32B and the frame 12, whereby the base 32B is arranged by a biasing force of the spring 81 in a condition shown in FIG. 13, i.e. so as to form a space allowing the seatbelt 16 to be inserted therethrough between the wavy surface 42 and itself.

Even in this third embodiment, similarly to the embodiments as described above, the seatbelt 16 can be freely wound up or wound off during normal operating conditions situation, whereby in an emergency of the vehicle, the wavy surfaces 40 and 42 clamp and lock the intermediate portion of the seatbelt, and a tension gradient is formed at the clamped portion, thereby preventing the seatbelt from being broken. In addition, in this embodiment, the pin 50 is provided with a roller 58 and also the contact portion 52 is provided with a roller 82, whereby the seatbelt can move more smoothly in the normal operating conditions.

Figure 15:
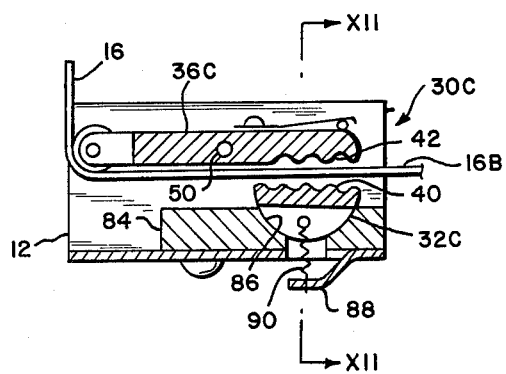
FIG. 15 is a fourth embodiment of a seatbelt locking device.
Figure 16:
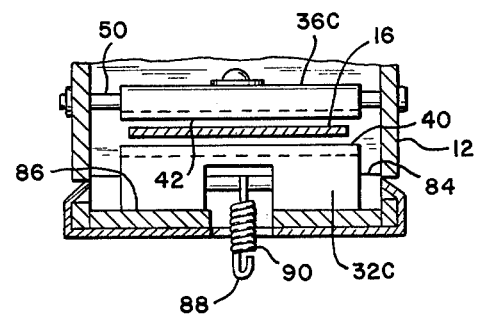
FIG. 16 is a cross-sectional view of FIG. 11 along the line XII—XII.

Next FIGS. 15 and 16 show a fourth embodiment of the present invention. In this embodiment, a base 32C is similar to that in the aforesaid third embodiment. However, the circumferential surface of the base 32C is received in a circumferential concave surface 86 formed in a block 84 solidly secured to the frame 12, and rotatable along the concave surface. Furthermore, a tension coil spring 90 is stretched between the base 32C and a supporting portion 88 which protudes from the frame 12, whereby the base 32C is resiliently secured on the concave surface 86, at a predetermined position where the wavy surface 40 separates from the wavy surface 42 to allow seatbelt 16 to pass freely therebetween.

With this arrangement, the same advantage as in the aforesaid third embodiment can be obtained by the present embodiment.

As is described above, the seatbelt locking device 30 provided by this invention makes it possible to lock an intermediate portion of the seatbelt during a vehicular emergency. Accordingly, this invention is able to prevent the tightening of the seatbelt on the retractor shaft which is unavoidable in conventional designs. As a result, this seatbelt locking device is able to restrain the passenger securely. In particular, the seatbelt lock provided by this invention clamps with a suitable tension gradient. Therefore, this invention possesses the superior advantage of being able to eliminate accidents in which the webbing is broken by the clamping force of a locking device.

It should be also apparent that the locking device need not be located within the retractor itself and could be positioned at some location remote from the retractor.

It should be apparent to those skilled in the art that the above described embodiment is merely illustrative of but a few of the many possible specific embodiments which represent the application of the principles of the present invention. Numerous and varied other arrangements can be readily devised by those skilled in the art without departing from the spirit and scope of the present invention.

What is claimed is:

1. A locking device for a seatbelt system comprising: a frame;
   a rotatable base having a wavy surface supported on said frame;
   a locking part supported on said frame and having an arm provided with a wavy surface adjacent to said rotatable base which under ordinary conditions is separated from the rotatable base so that a passenger-restraining seatbelt is allowed to pass freely between the locking part and the rotatable base, said wavy surfaces of said rotatable base and of said arm cooperating such that when said wavy surfaces approach each other, the seatbelt passing between said wavy surfaces is formed into a wavy shape to thereby clamp the seatbelt between said locking part and the rotatable base, said arm contacting the seatbelt to cause the locking part to approach the rotatable base when the tension on the seatbelt exceeds a given value;
   means for resiliently securing the rotatable base at a predetermined position where the passenger restraining seatbelt is allowed to pass freely between the locking part and the rotatable base; and
   a coupling device which will allow the arm to rotate about a minor axis which is transverse to the length of the seatbelt whereby the locking part is caused to press the seatbelt against the rotatable base across the entire width of said seatbelt.

2. A locking device for a seatbelt system according to claim 1, wherein said rotatable base is a longitudinal member having a semi-circular cross-section installed in a sector-shaped pivotal support hole.

3. A locking device for a seatbelt system according to claim 2, wherein said sector-shaped pivotal support hole has a central angle of about 200°.

4. A locking device for a seatbelt system according to claim 1, 2 or 3, wherein said means is a substantially letter "C" shaped torsion spring interposed between one end of the base and said frame.

5. A locking device for a seatbelt system according to claim 1, wherein said rotatable base is provided in a concave member formed on a block fixed to said frame such that said base rotates along the surface of said concave member.

6. A locking device for a seatbelt system according to claim 5, wherein said means is a tension coil spring stretched between the base and said frame.

* * * * *